(12) United States Patent
Lin et al.

(10) Patent No.: US 8,274,907 B2
(45) Date of Patent: Sep. 25, 2012

(54) NETWORK DEVICE AND METHOD FOR ESTABLISHING QUALITY OF SERVICE

(75) Inventors: Hsin-Chi Lin, Taipei Hsien (TW); Li-Jen Hsu, Taipei Hsien (TW); Shih-Min Hu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 940 days.

(21) Appl. No.: 12/345,512

(22) Filed: Dec. 29, 2008

(65) Prior Publication Data

US 2009/0268717 A1    Oct. 29, 2009

(30) Foreign Application Priority Data

Apr. 28, 2008   (CN) .......................... 2008 1 0301346

(51) Int. Cl.
*H04L 12/66*   (2006.01)

(52) U.S. Cl. ........ 370/252; 370/282; 370/352; 370/389; 370/401

(58) Field of Classification Search .................. None
See application file for complete search history.

(56) References Cited

U.S. PATENT DOCUMENTS

| | | | |
|---|---|---|---|
| 2007/0133441 A1* | 6/2007 | Kang et al. | 370/282 |
| 2007/0217406 A1* | 9/2007 | Riedel et al. | 370/389 |
| 2008/0205452 A1* | 8/2008 | Chou | 370/493 |
| 2008/0218209 A1* | 9/2008 | Lee et al. | 326/56 |

FOREIGN PATENT DOCUMENTS

CN   1421104 A   5/2003

OTHER PUBLICATIONS

Sanjeev Kayath, Signalling flows for the IP multimedia call control based on SIP in 3G Wireless Network, Jan. 2002, Department of Electrical Engineering, University of Illinois at Chicago.

* cited by examiner

*Primary Examiner* — Chi H. Pham
*Assistant Examiner* — Shick Hom
(74) *Attorney, Agent, or Firm* — Altis Law Group, Inc.

(57) ABSTRACT

A network device for establishing quality of service (QoS) between two terminal devices includes a transceiver module and a state-machine setting module. The transceiver module is configured for receiving establishing requests, request responses, acknowledge messages, and QoS requests from any one of the two terminal devices. The state-machine setting module is configured for setting a state of the network device according to a current state of the network device and messages received by the transceiver module, and the state of the network device includes an idle state, an inviting state, a trying state, an acknowledge state, and a QoS state.

16 Claims, 5 Drawing Sheets

US 8,274,907 B2

NETWORK DEVICE AND METHOD FOR ESTABLISHING QUALITY OF SERVICE

BACKGROUND

1. Technical Field

The disclosure relates to voice over Internet protocol (VoIP), and particularly to a network device and method for establishing quality of service (QoS).

2. Description of Related Art

In VoIP applications, voice packets need to be transmitted over networks with little delay and stable flow. If networks cannot provide QoS, they cannot make sure stable transmission of voice packets, which results in poor communication quality. There are two ways to establish QoS: a caller sends QoS requests before sending session initiation protocol (SIP) invitations; or a callee establishes QoS after receiving an SIP invitation from a caller.

However, a session may not be established successfully, thus establishing QoS before successfully establishing a session may waste QoS resources.

DETAILED DESCRIPTION

Figure 1:
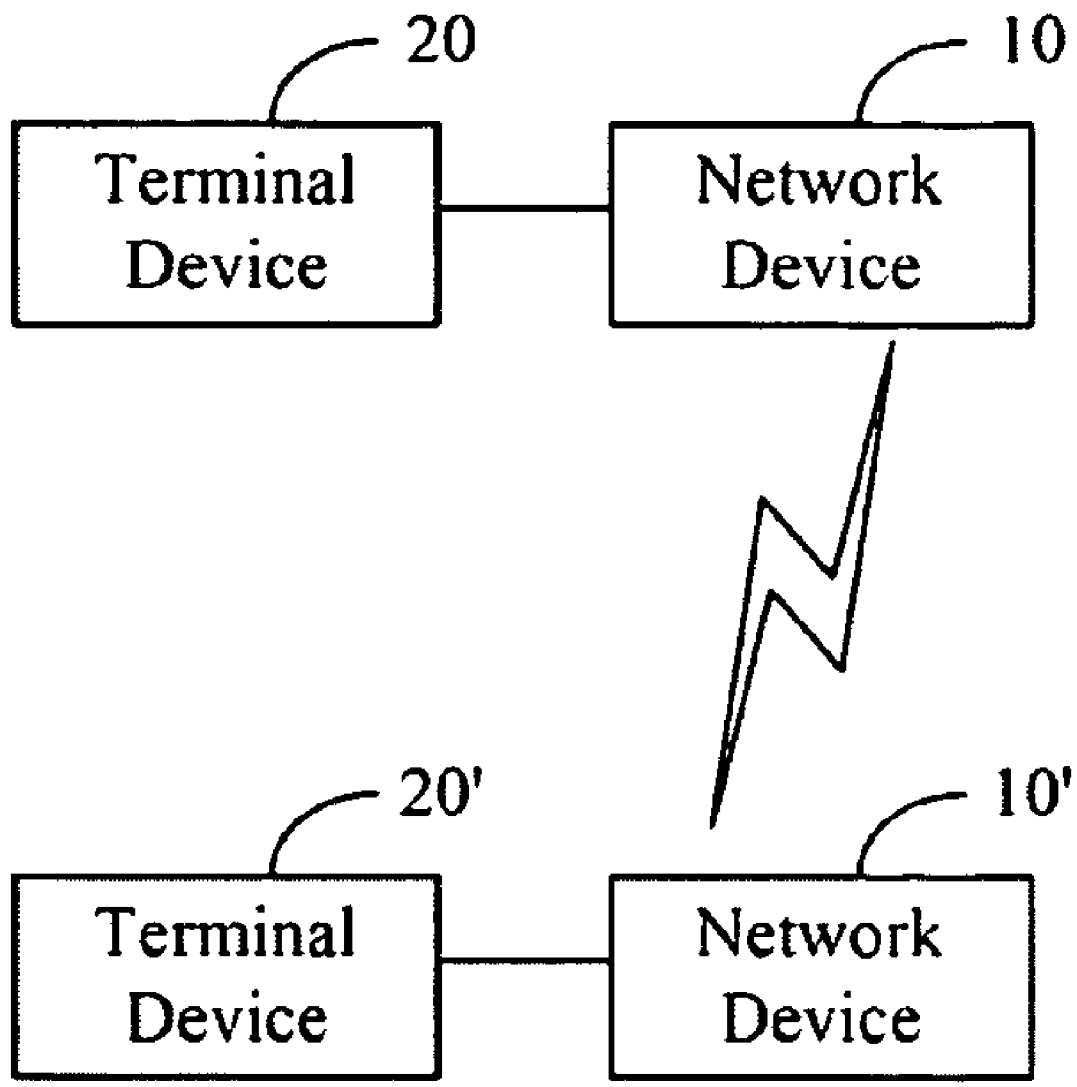
FIG. 1 is a schematic diagram of an application environment of a network device.

FIG. 1 is a schematic diagram of an application environment of a network device 10. Two terminal devices 20 and 20' respectively connect to network devices 10 and 10', and the network devices 10 and 10' are connected to a network, such as the Internet, thereby the two terminal devices 20 and 20' can communicate with each other. The network devices 10 and 10' may be a gateway, the network may be a voice over Internet protocol (VoIP) network, and the terminal devices 20 and 20' may be VoIP phones in one exemplary embodiment. The terminal devices 20 and 20' communicate with each other using voice packets and so quality of service (QoS) should be established between the terminal devices 20 and 20' to ensure stable transmission of the voice packets for quality communication between the terminal devices 20 and 20'. It is appreciated that the network devices 10 and 10' may be used in other networks. Structures and functions of the network devices 10 and 10' are the same, and are described by using the network device 10 as an example.

Figure 2:
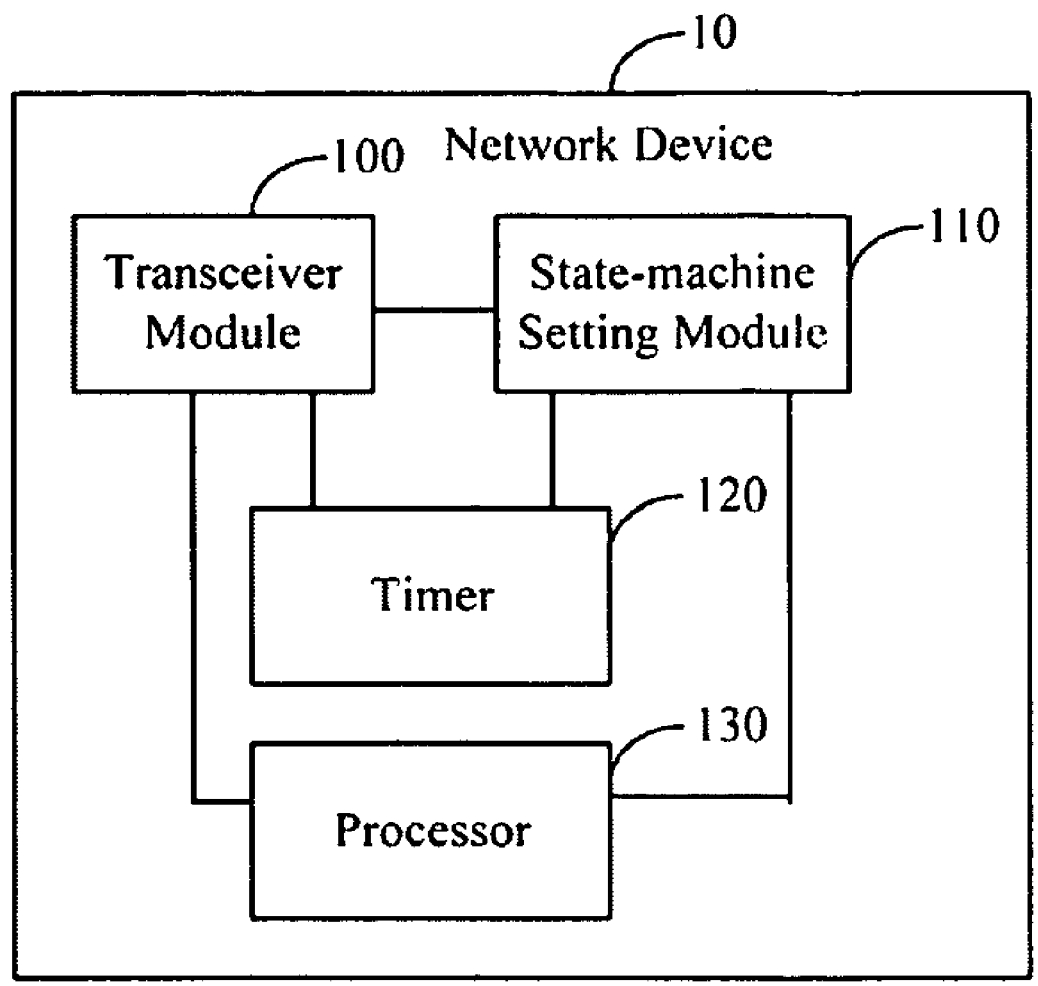
FIG. 2 is a schematic diagram of an embodiment of a network device.

FIG. 2 is a schematic diagram of an embodiment of the network device 10. In one embodiment, the network device 10 is configured for establishing QoS between the terminal devices 20 and 20', and includes a transceiver module 100 and a state-machine setting module 110. The network device 10 further includes at least one specialized or general purpose processor, such as a processor 130 for executing one or more computerized instructions for the transceiver module 100 and the state-machine setting module 110. The transceiver module 110 is configured for receiving and transmitting establishing requests, request responses, acknowledge messages, and QoS requests from any one of the two terminal devices 20 and 20'. The state-machine setting module 110 is configured for setting a state of the network device 10 according to a current state of the network device 10 and messages received by the transceiver module 110, where the state of the network device 10 includes an idle state, an inviting state, a trying state, an acknowledge state, and a QoS state, in that order.

The idle state is an initial state in which the network device 10 processes no messages and/or packets and there are no message transmissions between the terminal devices 20 and 20'. The inviting state, a next state of the idle state, is a state beginning to establish a session between the terminal devices 20 and 20', that is, a state after the network device 10 receives an establishing request. The trying state is a state of establishing the session between the terminal devices 20 and 20', that is, a state after the network device 10 receives a request response to the establishing request. The acknowledge state is a state indicating that the session between the terminal devices 20 and 20' is established successfully, that is, a state after the network devices 10 receives an acknowledge message response to the request response. The QoS state is a state that a QoS between the terminal devices 20 and 20' begins to be established and is established successfully. The state of the network devices 10 and 10' are substantially synchronous.

As an example, in an initial state, the network devices 10 and 10' may be in an idle state, and accordingly there may be no message transmissions between the terminal devices 20 and 20'. Then, one of the terminal devices 20 and 20' (i.e. a caller) transmits an establishing request to a corresponding one of the network devices 10 and 10' (for example, the network device 10) to transmit to another one of the terminal devices 20 and 20' (i.e. a callee) to establish communication. The transceiver module 100 of the network device 10 receives the establishing request while in the idle state, then transmits the establishing request to the callee through another one of the network devices 10 and 10' (for example, the network device 10'), and meanwhile the state-machine setting module 110 switches the state of the network device 10 from the idle state to the inviting state. The state of the network device 10' is also switched into the inviting state based on a transceiver module of the network device 10' receiving the establishing request. The callee transmits a request response back to the network device 10 through the network device 10' when accepting the establishing request. Then, the state of the network device 10' is switched into the trying state.

The transceiver module 100 of the network device 10 receives the request response while in the inviting state, then transmits the request response to the caller, and meanwhile the state-machine setting module 110 switches the state of the network device 10 from the inviting state to the trying state. In one embodiment, the transceiver module 100 is further configured for determining if the establishing request and the request response are from local terminal devices, which are in a local area network. If the establishing request and the request response are from local terminal devices, a communication between the terminal devices is an internal communication or the request responses are abnormal, and the state-machine setting module 110 switches the state of the network device 10 to the idle state.

The caller receives the request response, and transmits an acknowledge message to the network device 10. The transceiver module 110 receives the acknowledge message while in the trying state, then transmits the acknowledge message to the callee through the network device 10', and meanwhile the state-machine setting module 110 switches the state of the network device 10 from the trying state to the acknowledge state. Then, the state of the network device 10' is also switched into the acknowledge state. At this time, a session between the terminal devices 20 and 20' is successfully established, and the terminal devices 20 and 20' can communicate with each other. In one embodiment, the transceiver module 100 is further configured for determining if the request response and the acknowledge message are from local terminal devices. If the request response and the acknowledge message are from local terminal devices, the acknowledge messages is abnormal and the state-machine setting module 110 switches the state of the network device 10 to the idle state.

After the session between the terminal devices 20 and 20' is successfully established, if any one of the caller and the callee transmits a QoS request to the network device 10, the transceiver module 100 receives the QoS request while in the acknowledge state, then transmits the QoS request to the other one of the caller and the callee, and the state-machine setting module 110 switches the state of the network device 10 from the acknowledge state to the QoS state when the QoS between the terminal devices 20 and 20' is established successfully. In this embodiment, the network device 10 determines that the QoS is established successfully if receiving a QoS response from the other one of the caller and callee. Then, the terminal devices 20 and 20' can communicate with each other with QoS.

In one embodiment, the transceiver module 100 is further configured for receiving and transmitting bye messages, QoS release requests, and QoS release responses from one of the terminal devices 20 and 20', and the state of the network device 10 further includes a QoS release state. The release state is a state to release the QoS between the terminal devices 20 and 20'. When communication between the terminal devices 20 and 20' ends, one of the terminal devices 20 and 20' transmits a bye message to the network device 10 for ending the communication. The transceiver module 100 receives the bye message while in the QoS state, then transmits the bye message to the other one of the terminal devices 20 and 20', and meanwhile the state-machine setting module 110 switches the state of the network device 10 from the QoS state to the QoS release state. Then, one of the terminal devices 20 and 20' transmits a QoS release request to the network device 10, and the transceiver module 100 transmits the QoS release request to the other one of the terminal devices 20 and 20'. The other one of the terminal devices 20 and 20 transmits a QoS release response to the network device 10. The transceiver module 100 receives the QoS release response in the QoS release state, and the state-machine setting module 110 switches the state of the network device 10 from the QoS release state to the idle state.

In one embodiment, the network device 10 is used in a VoIP network, the establishing requests may be session initiation protocol (SIP) invitations, the request responses may be SIP 1XX-2XX responses, the acknowledge messages may be SIP ACK acknowledgements, and the bye messages may be SIP BYE messages.

In one embodiment, the network device 10 further includes a timer 120 for timing when the network device 10 switches to one of the inviting state, the trying state and the acknowledge state. The state-machine setting module 110 is further configured for switching the state of the network device 10 to the idle state when a predetermined period tracked by the timer 120 elapses in one of the inviting state, the trying state, and the acknowledge state and the transceiver module 100 receives no messages.

The state-machine setting module 110 switches the state of the network device 10 from the inviting state to the idle state when the transceiver module 100 receives an establishing cancel message or an establishing mistake message in the inviting state.

The state-machine setting module 110 switches the state of the network device 10 to the idle state when the transceiver module 100 receives the establishing cancel message in the trying state and the acknowledge state.

The state-machine setting module 110 switches the state of the network device 10 to the idle state when the transceiver module 100 receives a QoS unsuccessful message in the QoS state and the QoS release state.

Figure 3:
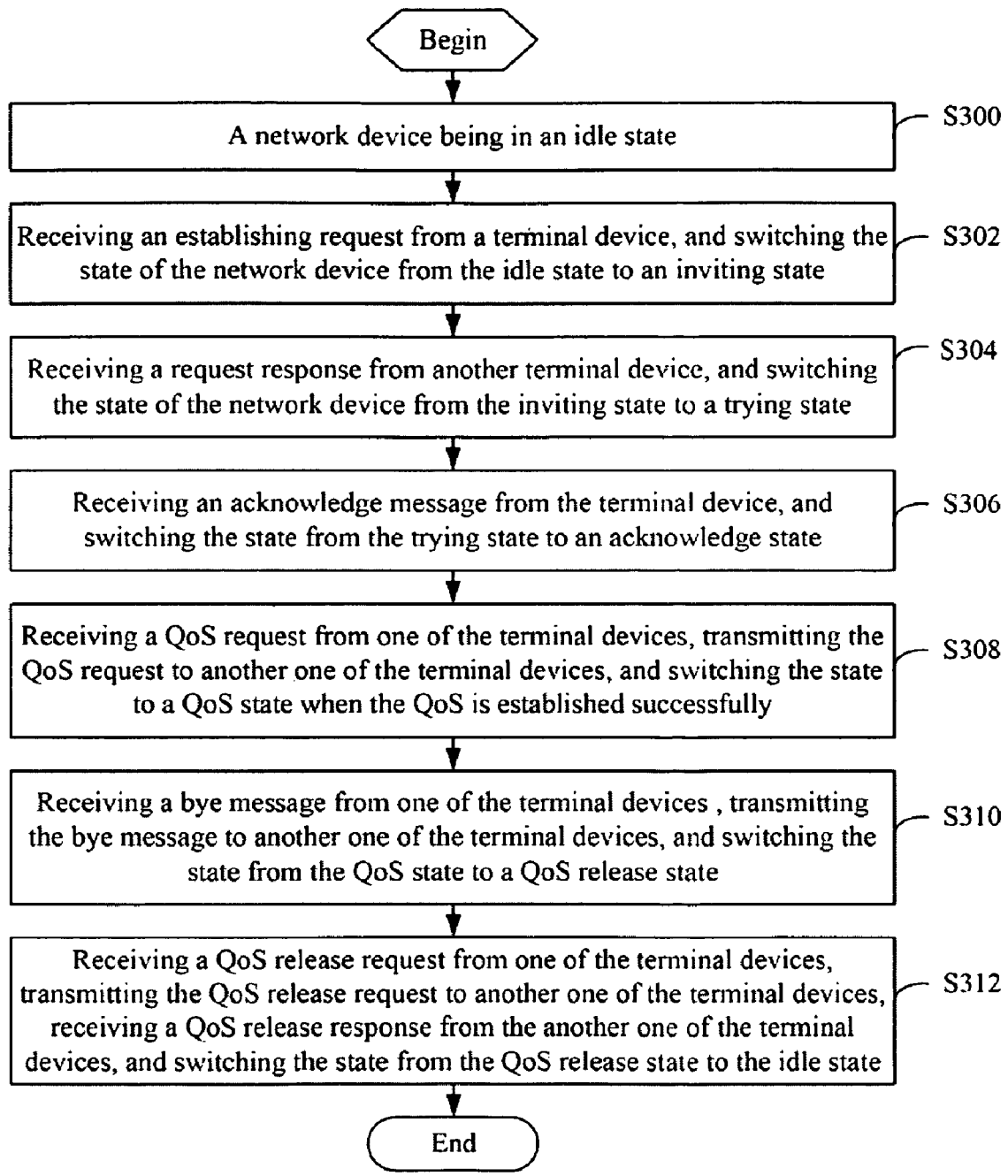
FIG. 3 is a flowchart illustrating a first embodiment of a method for establishing quality of service.

FIG. 3 is a flowchart illustrating a first embodiment of a method for establishing quality of service. Depending on the embodiment, certain of the blocks described below may be removed, others may be added, and the sequence of blocks may be altered. In block S300, there are no message transmissions between the terminal devices 20 and 20', and the network device 10 is in the idle state. Then, the terminal devices 20 and 20' need to communicate with each other, and one of the terminal devices 20 and 20' (for example, the terminal device 20) transmits an establishing request to the network device 10 to transmit to the terminal devices 20'. In block S302, the transceiver module 100 of the network device 10 receives the establishing request from the terminal device 20 while in the idle state, transmits the establishing request to the terminal device 20', and meanwhile the state-machine setting module 110 switches the state of the network device 10 from the idle state to the inviting state.

If the terminal device 20' accepts the establishing request, the terminal device 20' transmits a request response to the network device 10. In block S304, the transceiver module 100 receives the request response from the terminal device 20' in the inviting state, transmits the request response to the terminal device 20, and meanwhile the state-machine setting module 110 switches the state of the network device 10 from the inviting state to the trying state.

The terminal device 20 receives the request response, and transmits an acknowledge message to the network device 10. Continuing to block S306, the transceiver module 100 receives the acknowledge message from the terminal device 20 in the trying state, transmits the acknowledge message to the terminal device 20', and meanwhile the state-machine setting module 110 switches the state of the network device 10 from the trying state to the acknowledge state. At this time, a session is successfully established between the terminal devices 20 and 20'.

Then if one of the terminal devices 20 and 20' transmits a QoS request to the network device 10 at this time, in block S308, the transceiver module 100 receives the QoS request from the one of the terminal devices 20 and 20' in the acknowledge state, transmits the QoS request to the other one of the terminal devices 20 and 20', and the state-machine setting module 110 switches the state of the network device 10 from the acknowledge state to the QoS state when the QoS is established successfully. At this time, QoS is established successfully between the terminal devices 20 and 20', ensuring quality communication.

If communication between the terminal devices 20 and 20' ends, one of the terminal devices 20 and 20' transmits a bye message to the network device 10. Moving to block S310, the transceiver module 110 receives the bye message from the one of the terminal devices 20 and 20' in the QoS state, transmits the bye message to the other one of the terminal devices 20 and 20', and meanwhile the state-machine setting module 110 switches the state of the network device 10 from the QoS state to the QoS release state.

If one of the terminal devices 20 and 20' transmits a QoS release request to the network device 10, in block S312, the transceiver module 100 receives the QoS release request from the one of the terminal devices 20 and 20' in the QoS release state, transmits the QoS release request to the other one of the terminal devices 20 and 20', receives a QoS release response from the other one of the terminal devices 20 and 20', and the state-machine setting module 110 switches the state of the network device 10 from the QoS release state to the idle state.

Figure 4A:
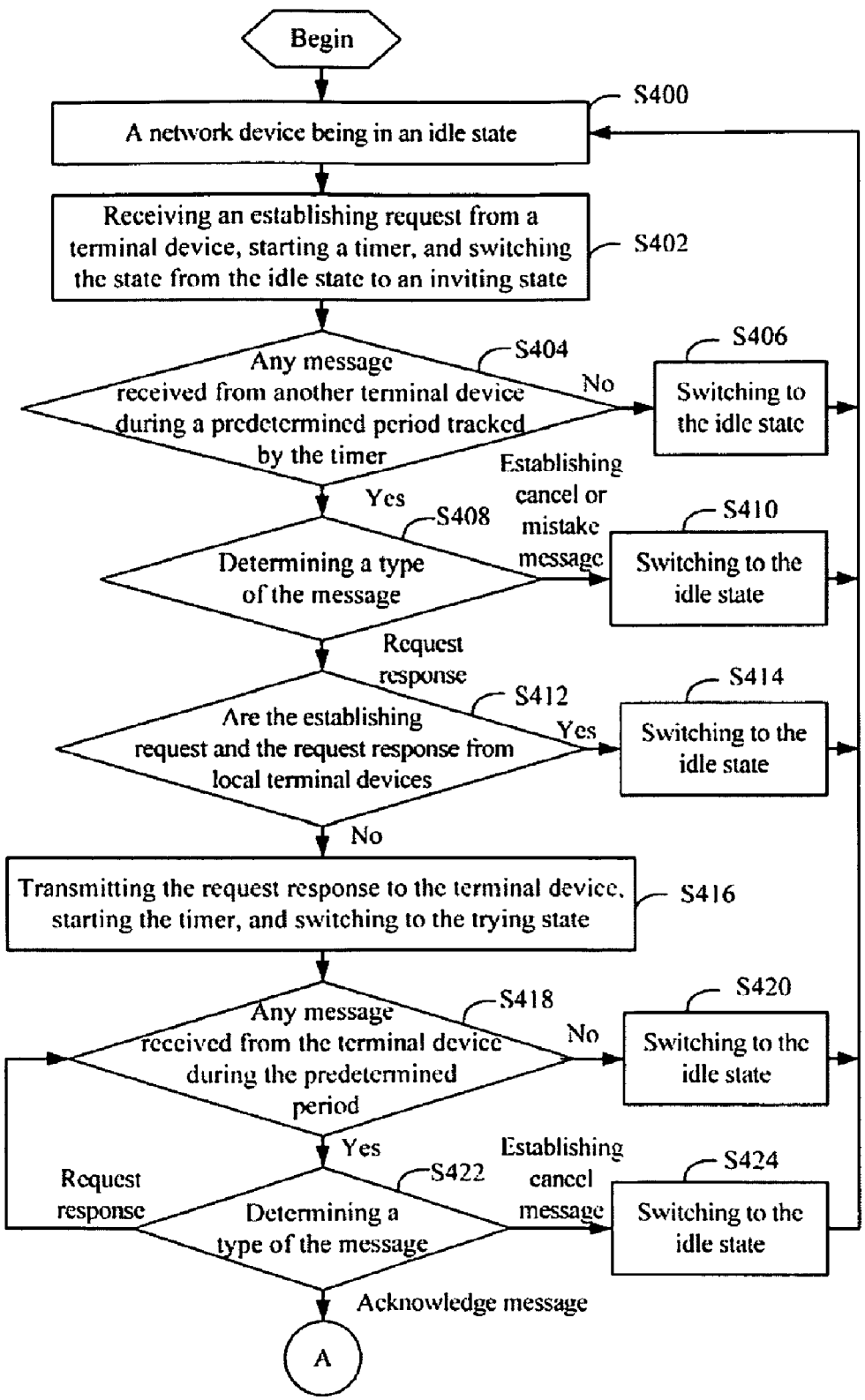
FIGS. 4A and 4B are flowcharts illustrating a second embodiment of a method for establishing quality of service.
Figure 4B:
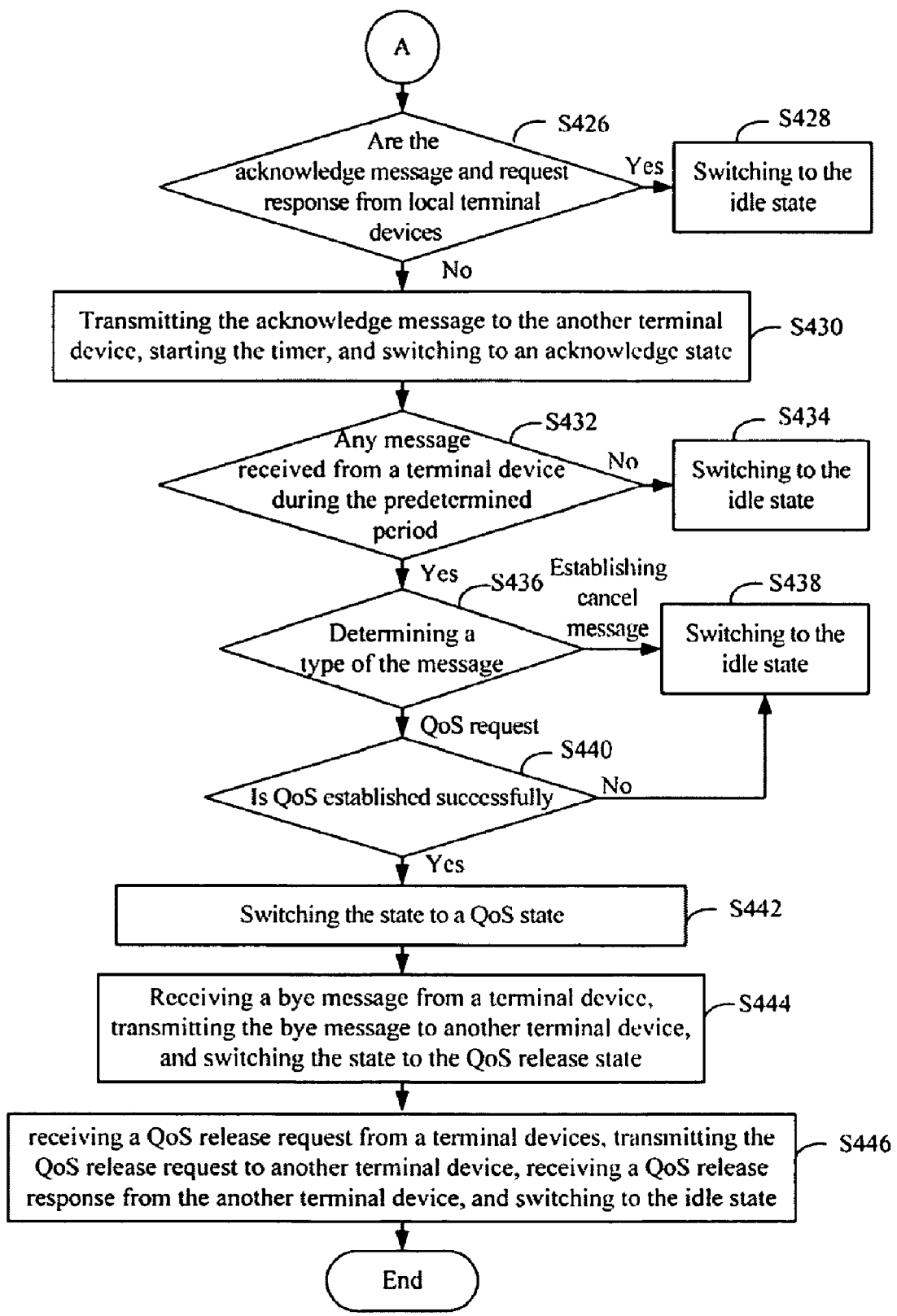

FIGS. 4A and 4B are flowcharts illustrating a second embodiment of a method for establishing quality of service. In block S400, the network device 10 is in the idle state. Then, the terminal device 20 transmits an establishing request to the network device 10 to transmit to the terminal device 20' to establish a session. Continuing to block S402, the transceiver module 100 of the network device 10 receives the establishing request from the terminal device 20 in the idle state, transmits the establishing request to the terminal device 20' through the network device 10', the timer 120 is started, and meanwhile the state-machine setting module 110 switches the state of the network device 10 from the idle state to the inviting state.

Moving to block S404, the transceiver module 100 determines if any message is received from the terminal device 20' during the predetermined period tracked by the timer 120. If the predetermined period elapses, and the transceiver module 100 has received no messages, in block S406, the state-machine setting module 110 switches the state of the network device 10 from the inviting state to the idle state, and the process goes back to block S400.

If the transceiver module 100 receives a message during the predetermined period, in block S408, the transceiver module 100 stops the timer 120 and determines a type of the received message. If the received message is an establishing cancel message or an establishing mistake message, in block S410, the state-machine setting module 110 switches the state of the network device 10 from the inviting state to the idle state, and the process goes back to block S400.

If the received message is a request response, in block S412, the transceiver module 100 determines if the establishing request and the request response are from local terminal devices. If the establishing request and the request response are from local terminal devices, a communication between the terminal devices is an internal communication in the local area network or the request response is abnormal, and the request response is ignored, then moving to block S414, the state-machine setting module 110 switches the state of the network device 10 from the inviting state to the idle state, and the process goes back to block S400.

If the establishing request and the request response are not from local terminal devices, in block S416, the transceiver module 100 transmits the request response to the terminal device 20, the timer 120 is started, and meanwhile the state-machine setting module 110 switches the state of the network device to the trying state.

Moving to block S418, the transceiver module 100 determines if any message is received from the terminal device 20 during the predetermined period tracked by the timer 120. If the predetermined period elapses, and the transceiver module 100 has received no messages from the terminal device 20, in block S420, the state-machine setting module 110 switches the state of the network device 10 to the idle state, and the process goes back to block S400.

If the transceiver module 100 receives a message from the terminal device 20 during the predetermined period, in block S422, the transceiver module 100 stops the timer 120, and determines a type of the received message. If the received message is an establishing cancel message, in block S424, the state-machine setting module 110 switches the state of the network device 10 to the idle state, and the process goes back to the block S400.

If the received message is a request response, the process goes back to block S418. If the received message is an acknowledge message, in block S426, the transceiver module 100 determines if the acknowledge message and the request response are from local terminal devices. If the acknowledge message and the request response are from local terminal devices, the received message, that is, the acknowledge message, is abnormal and can be ignored, in block S428, the state-machine setting module 110 switches the state of the network device to the idle state, and the process goes back to block S400.

If the acknowledge message and the request response are not from local terminal devices, in block S430, the transceiver module 100 transmits the acknowledge message to the terminal device 20', the timer 120 is started, and meanwhile the state-machine setting module 110 switches the state of the network device 10 to the acknowledge state.

Moving to block S432, the transceiver module 100 determines if any message is received from one of the terminal devices 20 and 20' during the predetermined period tracked by the timer 120. If the period elapses, and the transceiver module 100 has received no messages, in block S434, the state-machine setting module 110 switches the state of the network device 10 to the idle state, and the process goes back to block S400.

If the transceiver module 100 receives a message during the predetermined period, in block S436, the transceiver module 100 stops the timer 120, and determines a type of the received message. If the received message is an establishing cancel message, in block S438, the state-machine setting module 110 switches the state of the network device 10 to the idle state, and the process goes back to block S400.

If the received message is a QoS request, in step S440, the transceiver module 100 determines if the QoS is established successfully. In one embodiment, the transceiver module 100 determines if it has received a QoS request response to determine if the QoS is established successfully. If the transceiver module 100 receives a QoS request response, the transceiver module 100 determines the QoS is established successfully. If the QoS is not established, the process goes to block S438, the state-machine setting module 110 switches the state of the network device 10 to the idle state, and the process goes back to block S400.

If the QoS is established successfully, in block S442, the state-machine setting module 110 switches the state of the network device 10 to the QoS state.

If communication between the terminal devices 20 and 20' ends, one of the terminal devices 20 and 20' transmits a bye message to the network device 10. In block S444, the transceiver module 100 receives the bye message from the one of the terminal devices 20 and 20' in the QoS state, transmits the bye message to the other one of the terminal devices 20 and 20', and meanwhile the state-machine setting module 110 switches the state of the network device 10 to the QoS release state.

Then one of the terminal devices 20 and 20' transmits a QoS release request to the network device, in block S446, the transceiver module 100 receives the QoS release request from the one of the terminal devices 20 and 20', transmits the QoS release request to the other one of the terminal devices 20 and 20', receives a QoS release response from the other one of the terminal devices 20 and 20', and the state-machine setting module 110 switches the state of the network device 10 from the QoS release state to the idle state.

The network device 10 and the method for establishing quality of service request does so after a three-way handshake (i.e. after the callee receives the acknowledge message from the caller), thus avoiding waste and occupy of the QoS resources and making sure of the correctness of the QoS.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A network device for establishing quality of service (QoS) between two terminal devices, comprising:
    a transceiver module configured for receiving establishing requests, request responses, acknowledge messages, and QoS requests from any one of the two terminal devices;
    a state-machine setting module configured for setting a state of the network device according to a current state of the network device and messages received by the transceiver module, wherein the state of the network device comprises an idle state, an inviting state, a trying state, an acknowledge state, and a QoS state; and
    a processor that executes computerized instructions for the transceiver module and the state-machine setting module;
    wherein the state-machine setting module switches the state of the network device from the idle state to the inviting state when the transceiver module receives the establishing requests in the idle state;
    wherein the state-machine setting module switches the state of the network device from the inviting state to the trying state when the transceiver module receives the request response in the inviting state;
    wherein the state-machine setting module switches the state of the network device from the trying state to the acknowledge state when the transceiver module receives the acknowledge messages in the trying state; and
    wherein the state-machine setting module switches the state of the network device from the acknowledge state to the QoS state when the transceiver module receives the QoS request in the acknowledge state and the QoS is established successfully;
    wherein the transceiver module is further configured for receiving bye messages from any one of the two terminal device for ending a communication between the two terminal devices;
    wherein the state of the network device further comprises a QoS release state, and the state-machine setting module switches the state of the network device from the QoS state to the QoS release state when the transceiver module receives the bye messages in the QoS state.

2. The network device of claim 1, wherein the transceiver module is further configured for receiving QoS release requests from any one of the two terminal devices and receiving QoS release responses from the other one of the two terminal devices.

3. The network device of claim 2, wherein the state-machine setting module switches the state of the network device from the QoS release state to the idle state when the transceiver module receives the QoS release responses in the QoS release state.

4. The network device of claim 1, further comprising a timer for timing when the state of the network device is one of the inviting state, the trying state, and the acknowledge state.

5. The network device of claim 4, wherein the state-machine setting module is further configured for switching the state of the network device to the idle state when a predetermined period tracked by the timer elapses in one of the inviting state, the trying state, and the acknowledge state, and when the transceiver module receives no messages.

6. The network device of claim 1, wherein the transceiver module is further configured for determining if the establishing requests and the request responses are transmitted from local terminal devices.

7. The network device of claim 6, wherein the transceiver module is further configured for determining if the request responses and the acknowledge messages are from local terminal devices.

8. A method for establishing quality of service (QoS) between two terminal devices comprising a first terminal device and a second terminal device, for utilization in a network device connected to a network, comprising:
    in response to the network device being in an idle state, receiving an establishing request from the first terminal device, transmitting the establishing request to the second terminal device, and switching a state of the network device from the idle state to an inviting state;
    receiving a request response from the second terminal device in the inviting state, transmitting the request response to the first terminal device, and switching the state of the network device from the inviting state to a trying state;
    receiving an acknowledge message from the first terminal device in the trying state, transmitting the acknowledge message to the second terminal device, and switching the state of the network device from the trying state to an acknowledge state;
    receiving a QoS request from any one of the two terminal devices in the acknowledge state, and switching the state of the network device from the acknowledge state to the QoS state when the QoS between the two terminal devices is established successfully;
    receiving a bye message from any one of the two terminal devices for ending a communication between the two terminal devices in the QoS state;
    switching the state of the network device from the QoS state to a QoS release state;
    receiving a QoS release request from any one of the two terminal devices in the QoS release state; and
    receiving a QoS release response from the other one of the two terminal devices in the QoS release state, and switching the state of the network device from the QoS release state to the idle state.

9. The method for establishing QoS of claim 8, further comprising:
    starting a timer when the network device is switched into the inviting state;
    determining if any message is received during a predetermined period tracked by the timer; and
    switching the state of the network device from the inviting state to the idle state if no messages are received during the predetermined period tracked by the timer.

10. The method for establishing QoS of claim 9, further comprising:
    switching the state of the network device from the inviting state to the idle state if one of an establishing cancel message and an establishing mistake message is received during the predetermined period tracked by the timer.

11. The method for establishing QoS of claim 8, further comprising:
    starting a timer when the network device is switched into the trying state;
    determining if any message is received during a predetermined period tracked by the timer; and switching the state of the network device from the trying state to the idle state if no messages are received during the predetermined period tracked by the timer.

12. The method for establishing QoS of claim 11, further comprising:
switching the state of the network device from the trying state to the idle state if an establishing cancel message is received during the predetermined period tracked by the timer.

13. The method for establishing QoS of claim 8, further comprising:
starting a timer when the network device is switched into the acknowledge state;
determining if any message is received during a predetermined period tracked by the timer; and
switching the state of the network device from the acknowledge state to the idle state if no messages are received during the predetermined period tracked by the timer.

14. The method for establishing QoS of claim 13, further comprising:
switching the state of the network device from the acknowledge state to the idle state if an establishing cancel message is received during the predetermined period tracked by the timer.

15. The method for establishing QoS of claim 14, further comprising:
determining if the QoS between the two terminal devices is established successfully; and
switching the state of the network device to the idle state upon the condition that the QoS is established unsuccessfully.

16. A method utilized by a network device connected to a network for establishing quality of service (QoS) between two terminal devices comprising a first terminal device and a second terminal device, the method comprising:
in response to the network device being in a default state, the default state comprising a selected one of an idle state, an inviting state, a trying state, and an acknowledge state;
receiving a request package from the first terminal device, forwarding the request package to the second terminal device and switching the default state to a next one of the inviting state, the trying state, and the acknowledge state to the default state and repeating until the state of the network device is switched to the acknowledge state;
receiving a special QoS request from any one of the two terminal devices, and switching the acknowledge state to a QoS state when the QoS between the two terminal devices is established successfully;
receiving a bye message from any one of the two terminal devices for ending a communication between the two terminal devices in the QoS state, and switching the state of the network device from the QoS state to a QoS release state;
receiving a QoS release request from any one of the two terminal devices in the QoS release state; and
receiving a QoS release response from the other one of the two terminal devices in the QoS release state, and switching the state of the network device from the QoS release state to the idle state.

\* \* \* \* \*